US009679681B2

United States Patent
Faulkner et al.

(10) Patent No.: US 9,679,681 B2
(45) Date of Patent: Jun. 13, 2017

(54) HYBRID CABLE INCLUDING FIBER-OPTIC AND ELECTRICAL-CONDUCTOR ELEMENTS

(71) Applicant: Corning Cable Systems LLC, Hickory, NC (US)

(72) Inventors: Michael Todd Faulkner, Granite Falls, NC (US); Lars Kristian Nielsen, Hickory, NC (US)

(73) Assignee: CORNING OPTICAL COMMUNICATIONS LLC, Hickory, NC (US)

( * ) Notice: Subject to any disclaimer, the term of this patent is extended or adjusted under 35 U.S.C. 154(b) by 796 days.

(21) Appl. No.: 13/787,101

(22) Filed: Mar. 6, 2013

(65) Prior Publication Data

US 2013/0287349 A1 Oct. 31, 2013

Related U.S. Application Data

(60) Provisional application No. 61/639,528, filed on Apr. 27, 2012, provisional application No. 61/677,634, filed on Jul. 31, 2012.

(51) Int. Cl.
*G02B 6/44* (2006.01)
*H01B 11/22* (2006.01)

(52) U.S. Cl.
CPC .......... *H01B 11/22* (2013.01); *G02B 6/4416* (2013.01)

(58) Field of Classification Search
None
See application file for complete search history.

(56) References Cited

U.S. PATENT DOCUMENTS

| 2,594,983 | A | * | 4/1952 | Pease | ................... | H01B 11/186 |
|---|---|---|---|---|---|---|
| | | | | | | 174/106 R |
| 3,737,910 | A | * | 6/1973 | Francis | ................... | H01Q 1/362 |
| | | | | | | 343/873 |
| 4,497,537 | A | * | 2/1985 | Dench | .......................... | 385/108 |
| 5,095,176 | A | * | 3/1992 | Harbrecht | ............ | G02B 6/4422 |
| | | | | | | 174/107 |
| 5,448,669 | A | * | 9/1995 | Dunn | .................... | G02B 6/4416 |
| | | | | | | 174/117 R |
| 5,530,203 | A | * | 6/1996 | Adams | ................... | H01B 9/003 |
| | | | | | | 174/106 R |

(Continued)

FOREIGN PATENT DOCUMENTS

| CN | 102222546 A | 10/2011 |
|---|---|---|
| CN | 202067602 U | 12/2011 |

(Continued)

OTHER PUBLICATIONS

Nexans "Multimode Fiber Optic Cable for FTTA," http://www.nexans.fr/eservice/France-en/pdf-family_9444/Outdoor_hybrid_cables_unshielded_.pdf, 3 pages.

*Primary Examiner* — Chad Smith
(74) *Attorney, Agent, or Firm* — William D. Doyle

(57) ABSTRACT

A hybrid cable includes a first jacket and a second jacket with webbing connecting the first and second jackets, where the second jacket has a larger cross-sectional area than the first jacket. Optical fibers extend through a cavity of the first jacket. Conductive wires extend through a cavity of the second jacket. Metallic shielding surrounds the conductive wires, positioned between the conductive wires and the second jacket within the cavity of the second jacket.

2 Claims, 5 Drawing Sheets

(56) References Cited

U.S. PATENT DOCUMENTS

| | | | |
|---|---|---|---|
| 5,651,081 A | 7/1997 | Blew et al. | |
| 5,883,334 A * | 3/1999 | Newmoyer | H01B 11/02 |
| | | | 174/113 C |
| 6,249,628 B1 * | 6/2001 | Rutterman et al. | 385/106 |
| 6,563,990 B1 * | 5/2003 | Hurley | G02B 6/4422 |
| | | | 385/101 |
| 8,676,010 B2 * | 3/2014 | Congdon, II | G02B 6/44 |
| | | | 385/101 |
| 2002/0001441 A1 | 1/2002 | Avellanet | |
| 2003/0123824 A1 * | 7/2003 | Tatarka | G02B 6/441 |
| | | | 385/113 |
| 2012/0008904 A1 | 1/2012 | Han et al. | |

FOREIGN PATENT DOCUMENTS

| | | |
|---|---|---|
| CN | 202093884 U | 12/2011 |
| CN | 202134260 U | 2/2012 |

* cited by examiner

HYBRID CABLE INCLUDING FIBER-OPTIC AND ELECTRICAL-CONDUCTOR ELEMENTS

RELATED APPLICATIONS

This application claims the benefit of U.S. Provisional Application Nos. 61/639,528 filed Apr. 27, 2012 and 61/677,634 filed Jul. 31, 2012, which are both incorporated by reference herein in their entireties.

BACKGROUND

Aspects of the present disclosure relate generally to hybrid cables that include both fiber-optic and electrical-conductor elements, such as for use with fiber-to-the-antenna applications.

SUMMARY

One embodiment relates to a hybrid cable. The hybrid cable includes a first jacket and a second jacket with webbing connecting the first and second jackets, where the second jacket has a larger cross-sectional area than the first jacket. Optical fibers extend through a cavity of the first jacket. Conductive wires extend through a cavity of the second jacket. Metallic shielding surrounds the conductive wires, positioned between the conductive wires and the second jacket within the cavity of the second jacket.

Another embodiment relates to a hybrid cable, which includes a first jacket and a second jacket joined by webbing, where the cross-sectional area of the cavity of the first jacket is less than half of the cross-sectional area of the cavity of the second jacket. Optical fibers extend through the cavity of the first jacket. Conductive wires extend through the cavity of the second jacket.

Yet another embodiment relates to a hybrid cable, which includes a first jacket and a second jacket joined by webbing, where the second jacket has a larger cross-sectional area than the first jacket. Optical fibers extend through a cavity of the first jacket. Conductive wires extend through a cavity of the second jacket. The conductive wires are stranded around a central strength member, and the central strength member includes glass- or aramid-reinforced composite.

Additional features and advantages are set forth in the Detailed Description that follows, and in part will be readily apparent to those skilled in the art from the description or recognized by practicing the embodiments as described in the written description and claims hereof, as well as the appended drawings. It is to be understood that both the foregoing general description and the following Detailed Description are merely exemplary, and are intended to provide an overview or framework to understand the nature and character of the claims.

BRIEF DESCRIPTION OF THE FIGURES

The accompanying Figures are included to provide a further understanding, and are incorporated in and constitute a part of this specification. The drawings illustrate one or more embodiments, and together with the Detailed Description serve to explain principles and operations of the various embodiments. As such, the disclosure will become more fully understood from the following Detailed Description, taken in conjunction with the accompanying Figures, in which.

DETAILED DESCRIPTION

Before turning to the Figures, which illustrate exemplary embodiments in detail, it should be understood that the present inventive and innovative technology is not limited to the details or methodology set forth in the Detailed Description or illustrated in the Figures. For example, as will be understood by those of ordinary skill in the art, features and attributes associated with embodiments shown in one of the Figures may be applied to embodiments shown in others of the Figures.

Cellular service providers may deploy Remote Radio Head (RRH) solutions throughout their antenna networks, a process that involves locating power radio frequency (RF) amplifiers at the top of the antenna (e.g., cell tower; radio tower; cell site). Remote Radio Head (RRH) solutions accordingly require cabling arrangements that deliver both power for the amplifiers and the high bandwidth capabilities of a fiber cable. Such arrangement may vary widely, but one suitable arrangement includes use of a cable that combines electrical conductors with optical fibers, known as a hybrid cable.

Figure 1:
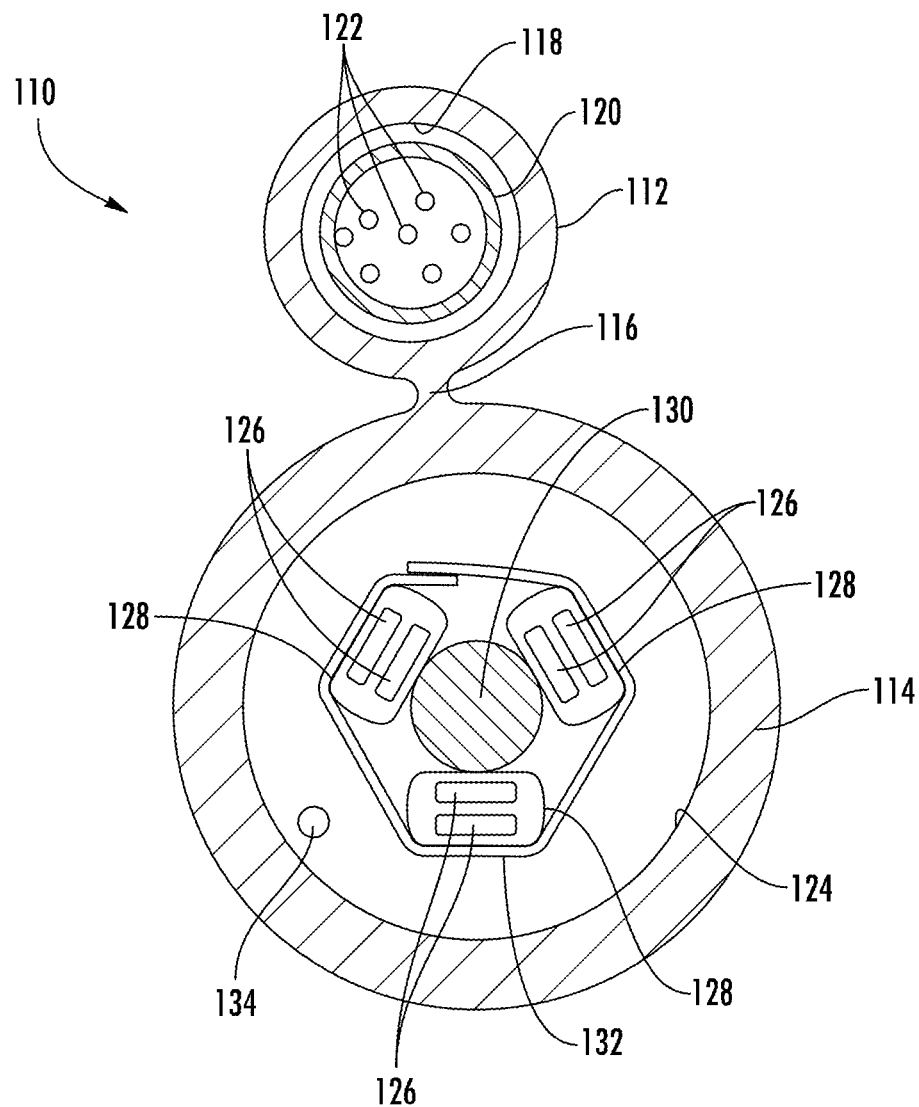
FIG. 1 is a sectional view of a "figure 8" hybrid cable according to an exemplary embodiment.
Figure 2:
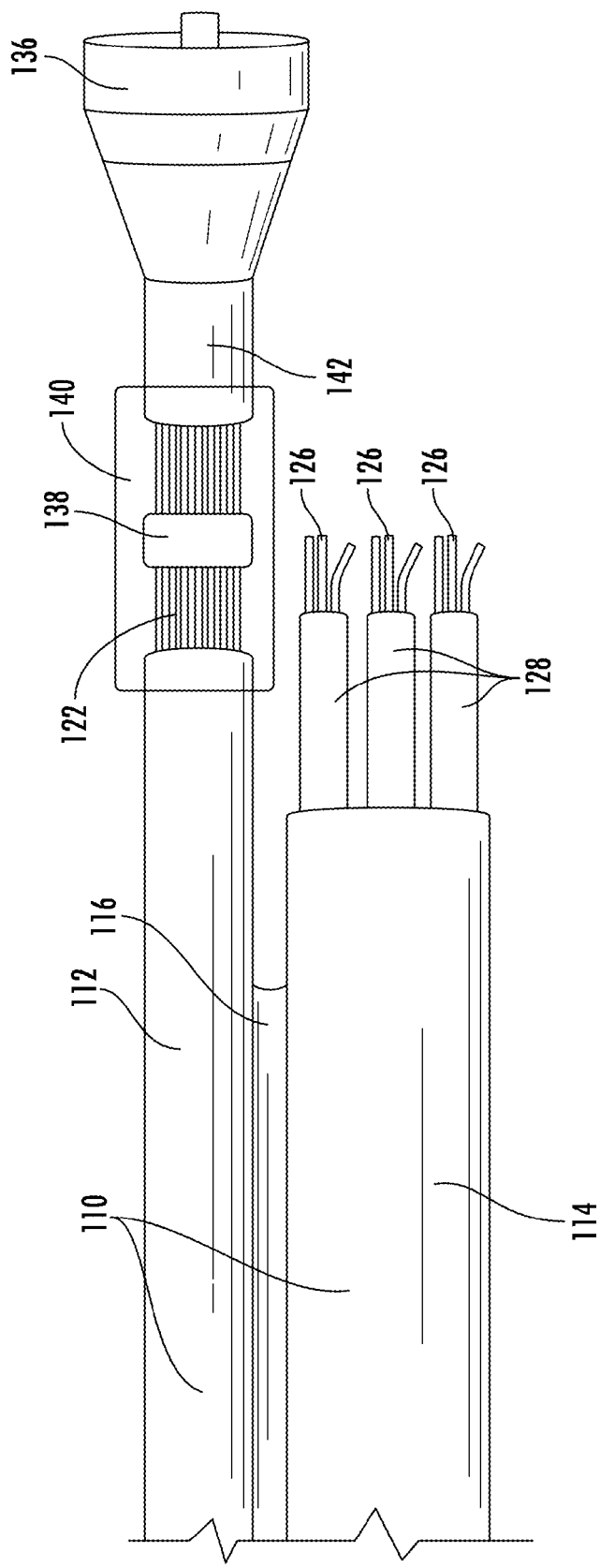
FIG. 2 is a side view of the cable of FIG. 1 with a fiber optic connector.

Referring to FIGS. 1 and 2, a "figure-8" style hybrid cable 110 includes first and second jackets 112, 114 joined by webbing 116. The first jacket 112 includes a cavity 118 that supports a buffer tube 120 containing optical fibers 122, such as twelve individual fibers or a ribbon(s) of fibers. The second jacket 114 includes a cavity 124 that supports conductive wires 126, such as pairs of 8 or 10 AWG wires within radio-frequency shielding 128. According to an exemplary embodiment, the first jacket 112 is smaller than the second 114, such as by at least half in terms of cross-sectional area as shown in FIG. 1, thereby providing the first jacket 112 the ability to pass through narrow ducts in antenna hardware for routing optical signals.

According to an exemplary embodiment, the pairs 126 are stranded about a dielectric central strength member 130, such as a glass- or aramid-reinforced composite rod. Water-blocking tape 132 surrounds the conductive pairs 126, and a rip cord 134 is positioned between the water-blocking tape 132 and the second jacket 114.

As shown in FIG. 2, a connector 136 may be spliced to the optical fibers 122 of the first jacket 112, such as by way of a splice demarc 138 (e.g., flexibly overmolded with an elongate polyurethane housing 140, as described herein) and a furcation tube 142. The conductive elements 126 may likewise be joined to connectors or tethers.

Figure 3:
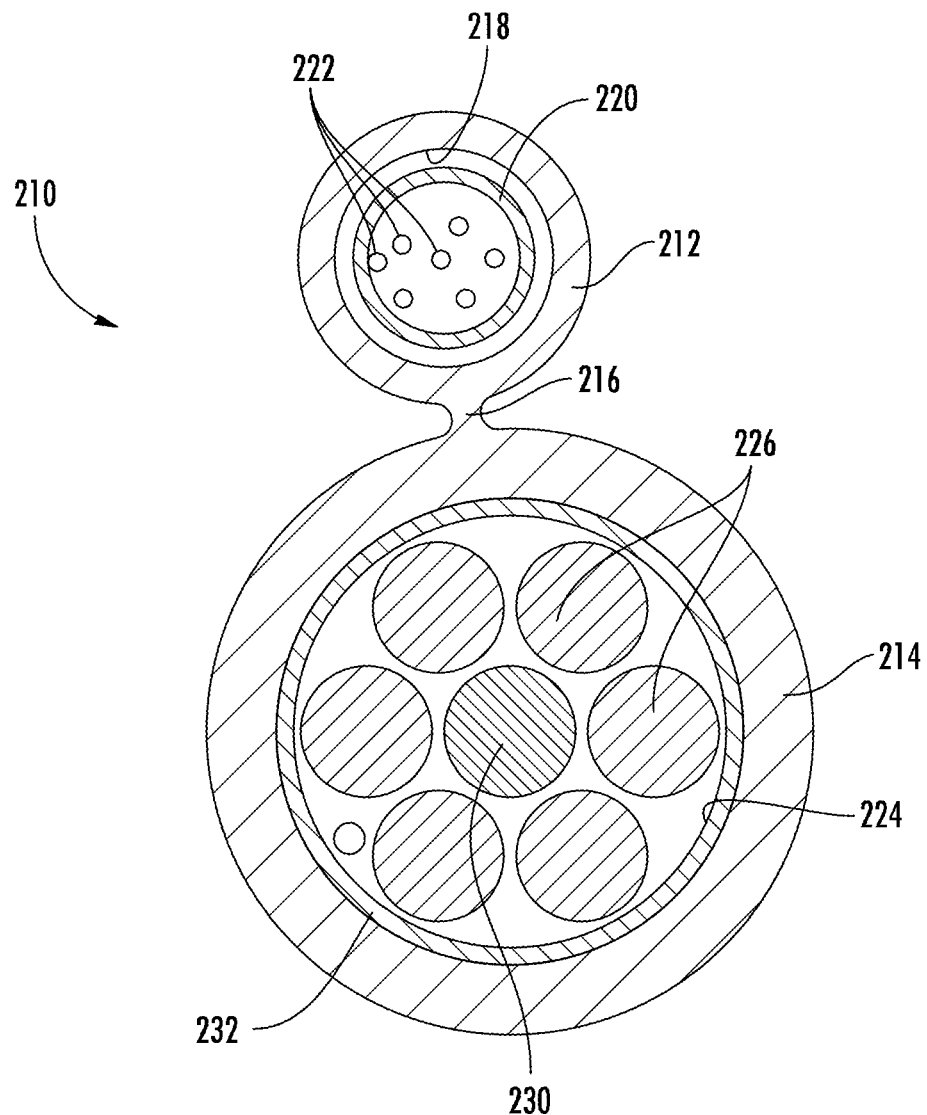
FIGS. 3-4 are sectional views of "figure 8" hybrid cables according to other exemplary embodiments.
Figure 4:
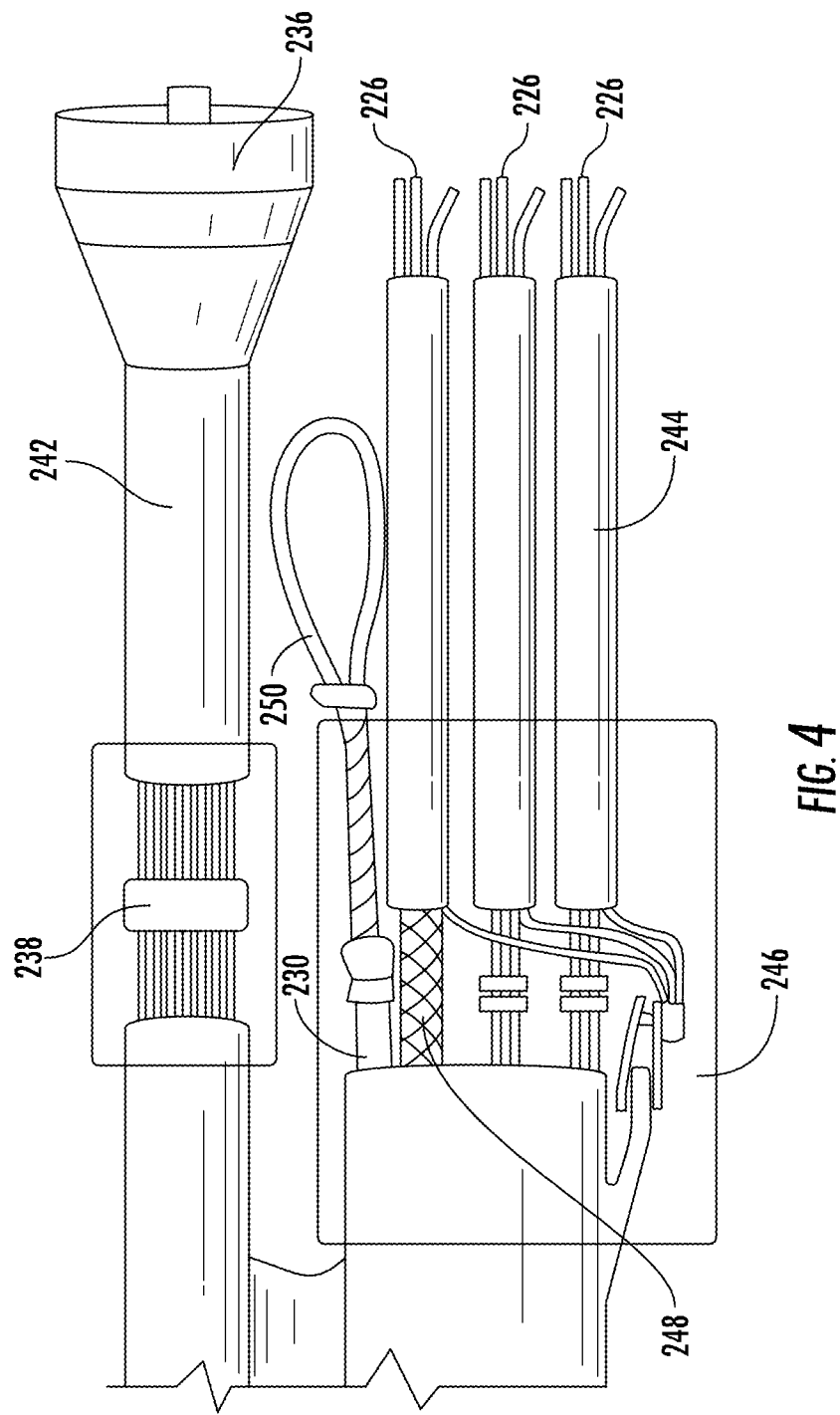

Referring to FIGS. 3 and 4, a "figure 8" style hybrid cable 210, according to another embodiment, includes first and second jackets 212, 214 joined by webbing 216. The first jacket 212 includes a cavity 218 that supports a buffer tube 220 containing optical fibers, such as twelve individual fibers 222 or a ribbon(s) of fibers 322. The second jacket 214 includes a cavity 224 that supports conductive wires 226, such as 6, 8, and/or 10 AWG copper wires. The conductive elements 226 are stranded about a dielectric central strength member 230. Armor shielding 232 surrounds all of the conductive elements 226 and adjoins the second jacket 214.

As shown in FIG. 4, a connector 236 may be spliced to the optical fibers 222 of the first jacket 212, such as by way of a splice demarc 238 (e.g., overmolded with polyurethane) and a furcation tube 242 or tether. The conductive elements 226 may likewise be joined to individually radio-frequency shielded power tethers 244 and overmolded in an elongate, flexible housing 246 as disclosed herein. Shielding 248 of the tethers may be electrically coupled to the armor 232, to provide a path for grounding the tethers 244 through the overmolded housing 246. The shielding 248 of the conductive elements 226 may reduce unwanted "noise" that could potentially obscure the signal provided by an associated antenna. A pulling grip 250 may be attached to the central strength member 230 for hauling and storing the housing 246.

Figure 5:
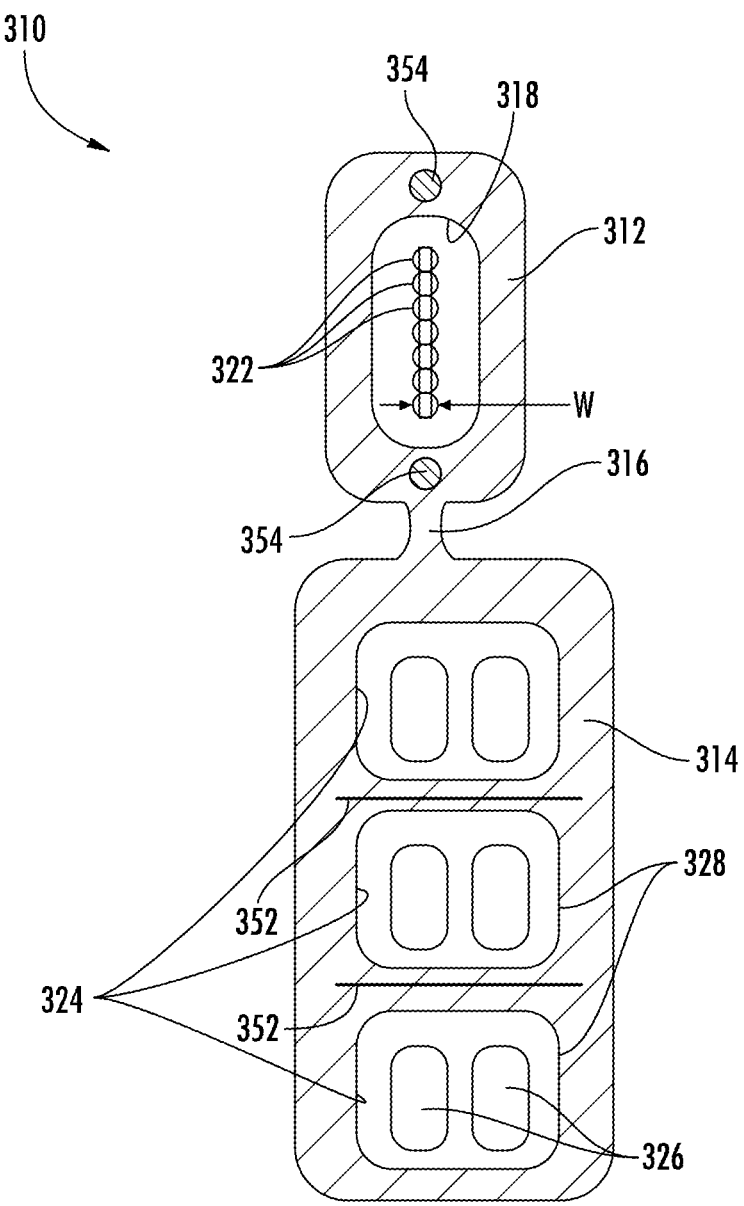
FIG. 5 is a side view of the cable of FIG. 3 with a fiber optic connector.

Referring to FIG. 5, a "figure 8" style hybrid cable 310, according to yet another embodiment, includes first and second jackets 312, 314 joined by webbing 316. The first jacket 312 includes a cavity 318 that supports optical fibers, such as a ribbon(s) 322 of fibers. The second jacket 314 includes a cavity 324 that supports conductive wires 326, such as pairs of 8 or 10 AWG wires within radio-frequency shielding 328. The wires 326 may alternatively be standard, non-shielded wires 226.

As shown in FIG. 14B, the pairs 326 are aligned with one another, aligned with the webbing 316, and aligned with the width axis W of the ribbon 322 so that the cable 310 has a common bend axis, providing lower attenuation to the optical fibers in the ribbon 322 (due to lower bending stress). In some embodiments, the pairs of conductors 326 may be separated from one another by tear features 352, such as polypropylene co-extruded into the second jacket 314, which may be primarily polyethylene. Strength members 354 may be extruded into the first jacket 312 to facilitate the preferential bend of the ribbon 322, particularly if the webbing 316 is split to separate the first and second jackets 312, 314.

The construction and arrangements of the hybrid cable, as shown in the various exemplary embodiments, are illustrative only. Although only a few embodiments have been described in detail in this disclosure, many modifications are possible (e.g., variations in sizes, dimensions, structures, shapes, and proportions of the various elements, values of parameters, mounting arrangements, use of materials, colors, orientations, etc.) without materially departing from the novel teachings and advantages of the subject matter described herein. Some elements shown as integrally formed may be constructed of multiple parts or elements, the position of elements may be reversed or otherwise varied, and the nature or number of discrete elements or positions may be altered or varied. The order or sequence of any process, logical algorithm, or method steps may be varied or re-sequenced according to alternative embodiments. Other substitutions, modifications, changes and omissions may also be made in the design, operating conditions and arrangement of the various exemplary embodiments without departing from the scope of the present inventive and innovative technology.

What is claimed is:

1. A hybrid cable, comprising:
a first jacket defining a cavity therein;
optical fibers, wherein the optical fibers extend through the cavity of the first jacket;
a second jacket defining a cavity therein, wherein the second jacket has a larger cross-sectional area than the first jacket;
an elongate central strength rod located within the second jacket, wherein the elongate central strength rod includes a dielectric material and comprises glass- or aramid-reinforced composite;
a plurality of pairs of conductive wires, each pair of conductive wires stranded around the elongate central strength rod, wherein the conductive wires extend through the cavity of the second jacket;
metallic shielding surrounding the conductive wires, positioned between the conductive wires and the second jacket within the cavity of the second jacket, wherein the metallic shielding comprises multiple, separate metallic shields, each metallic shield surrounding a pair of the conductive wires;
a water-blocking tape surrounding the plurality of pairs of conductive wires, the separate metallic shields and the elongate central strength rod, wherein the tape is positioned between the stranded pairs of conductive wires and the second jacket and the elongate central strength rod is located outside of all of the separate metallic shields; and
webbing connecting the first and second jackets.

2. A hybrid cable, comprising:
a first jacket defining a cavity therein,
optical fibers, wherein the optical fibers extend through the cavity of the first jacket;
a second jacket defining a cavity therein, wherein the cross-sectional area of the cavity of the first jacket is less than half of the cross-sectional area of the cavity of the second jacket;
at least two conductive wires, wherein the conductive wires extend through the cavity of the second jacket;
an elongate central strength rod comprising glass- or aramid-reinforced composite material located between the at least two conductive wires;
a metallic shield located within the second jacket and surrounding the at least two conductive wires, wherein the at least two conductive wires comprise at least three pairs of conductive wires, wherein each pair of the conductive wires is separately housed within a metallic shield, wherein each pair of conductive wires and the metallic shield are stranded around the elongate central strength rod; and
webbing connecting the first and second jackets.

* * * * *